(12) United States Patent
Davis et al.

(10) Patent No.: US 10,393,270 B2
(45) Date of Patent: Aug. 27, 2019

(54) BRUSH SEAL WITH SLIDING BACKING PLATE

(71) Applicant: United Technologies Corporation, Farmington, CT (US)

(72) Inventors: Timothy M Davis, Kennebunk, ME (US); Jose R. Paulino, Saco, ME (US); Mark J. Rogers, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/664,141

(22) Filed: Jul. 31, 2017

(65) Prior Publication Data

US 2019/0032786 A1     Jan. 31, 2019

(51) Int. Cl.
*F16J 15/3288* (2016.01)
*F01D 11/00* (2006.01)
*F01D 9/02* (2006.01)
*F01D 11/08* (2006.01)

(52) U.S. Cl.
CPC ......... *F16J 15/3288* (2013.01); *F01D 11/005* (2013.01); *F01D 9/02* (2013.01); *F01D 11/08* (2013.01); *F05D 2220/32* (2013.01); *F05D 2230/60* (2013.01); *F05D 2240/56* (2013.01)

(58) Field of Classification Search
CPC ....... F16J 15/3288; F01D 11/005; F01D 9/02; F01D 11/08; F05D 2220/32; F05D 2230/60; F05D 2240/56
USPC ....................................................... 277/300
See application file for complete search history.

(56) References Cited

U.S. PATENT DOCUMENTS

| | | | | |
|---|---|---|---|---|
| 5,351,971 A * | 10/1994 | Short | ................... | F16J 15/3288 277/355 |
| 5,480,165 A * | 1/1996 | Flower | ................. | F16J 15/3288 277/355 |
| 6,428,009 B2 * | 8/2002 | Justak | ................. | F16J 15/3288 277/355 |
| 6,565,094 B2 * | 5/2003 | Wright | ................. | F16J 15/3288 277/355 |
| 6,695,314 B1 | 2/2004 | Gail et al. | | |
| 7,021,631 B2 * | 4/2006 | Wright | ................. | F16J 15/3288 277/355 |
| 7,410,173 B2 | 8/2008 | Justak | | |
| 2001/0004145 A1 | 6/2001 | Wright et al. | | |
| 2004/0066005 A1 * | 4/2004 | Amos | ................... | F16J 15/008 277/391 |

(Continued)

OTHER PUBLICATIONS

Extended European Search Report for EP Application No. 18186412.5, dated Jan. 24, 2019, pp. 5.

*Primary Examiner* — Nathan Cumar
(74) *Attorney, Agent, or Firm* — Kinney & Lange, P.A.

(57) ABSTRACT

A brush seal includes a bristle pack disposed between a top plate and a back plate. A sliding backing plate is disposed between the bristle pack and the back plate. The bristle pack includes a first bristle set that extends across a seal gap between a first engine component and a second engine component to prevent leakage across the seal gap and a second bristle set that exerts a force on the sliding backing plate. The sliding backing plate supports at least a portion of the first bristles and extends across the seal cavity to contact the second component. The force exerted on the sliding backing plate drives the sliding backing plate into contact with the second component.

19 Claims, 10 Drawing Sheets

(56) References Cited

U.S. PATENT DOCUMENTS

2010/0054924 A1 3/2010 Uyama et al.

* cited by examiner

BRUSH SEAL WITH SLIDING BACKING PLATE

BACKGROUND

This disclosure relates generally to seals. More particularly, this disclosure relates to brush seals having a sliding backing plate.

Brush seals include wire bristles that extend across seal cavities between a first component and a second component to reduce airflow through the seal cavity. Brush seals typically include a top plate, a backing plate, and a bristle pack extending from between the top plate and the backing plate and across the seal cavity. The backing plate provides support to the bristles to prevent the bristles from deforming. A backing plate gap is formed in the seal cavity between a distal end of the backing plate and the second component that the bristles extend towards and contact. The portion of the bristles extending across the backing plate gap is unsupported, and as such, the bristles can blow over and deform at high pressures and temperatures. However, a relatively large backing plate gap is required in active seal cavities, which are seal cavities where the two components move relative to each other such that the seal cavity expands and contracts during operation, to prevent clashing between the backing plate and the second component. Clashing occurs where the second component contacts the backing plate, and clashing can cause damage to the components defining the seal cavity and to the brush seal.

SUMMARY

According to one aspect of the disclosure a brush seal includes a top plate, a back plate, a bristle pack secured at a joint between the top plate and the back plate, and a sliding backing plate. The bristle pack includes a first bristle set extending from the joint and a second bristle set extending from the joint. The sliding backing plate includes a sliding portion disposed between the back plate and the second bristle set; and a support portion having an inner face and a support face, the inner face contacting a distal end of the second bristles, and the support face disposed below and configured to support at least a portion of the first bristle set. The sliding backing plate is configured to slide relative to the back plate.

According to another aspect of the disclosure, a gas turbine engine includes a first engine component, a second engine component, a seal cavity extending between the first engine component and the second engine component, and a brush seal secured to the first engine component. The brush seal includes a top plate, a back plate, a bristle pack secured at a joint between the top plate and the back plate, and a sliding backing plate. The bristle pack includes a first bristle set extending from the joint across the seal cavity toward the second engine component and configured to contact the second engine component and a second bristle set extending from the joint towards the second engine component. The sliding backing plate includes a sliding portion disposed between the back plate and the second bristle set; and a support portion having an inner face, a support face, and a contact face, the inner face contacting a distal end of the second bristles, the support face disposed below and configured to support at least a portion of the first bristle set, and the contact face contacting the second engine component. The sliding backing plate is configured to slide relative to the back plate to maintain contact between the contact face and the second engine component and the second bristle set is configured to exert a first pushing force on an inner face of the support portion to drive the sliding backing plate into contact with the second engine component.

According to yet another aspect of the disclosure, a method of assembling a brush seal inside a seal cavity between a first engine component and a second engine component includes securing a first bristle set and a second bristle set between a top plate and a back plate; inserting a sliding portion of a sliding backing plate between the second bristle set and the back plate such that a distal end of the second bristles contacts and exerts a force on an inner face of a support portion of the sliding backing plate, and such that a support face of the sliding backing plate is disposed adjacent the first bristle set; securing the sliding backing plate to the back plate with an adhesive configured to vaporize at an operating temperature within the seal cavity; and attaching the brush seal to the first engine component such that the first bristle set extends into the seal cavity and contacts the second engine component.

DETAILED DESCRIPTION

Figure 1:
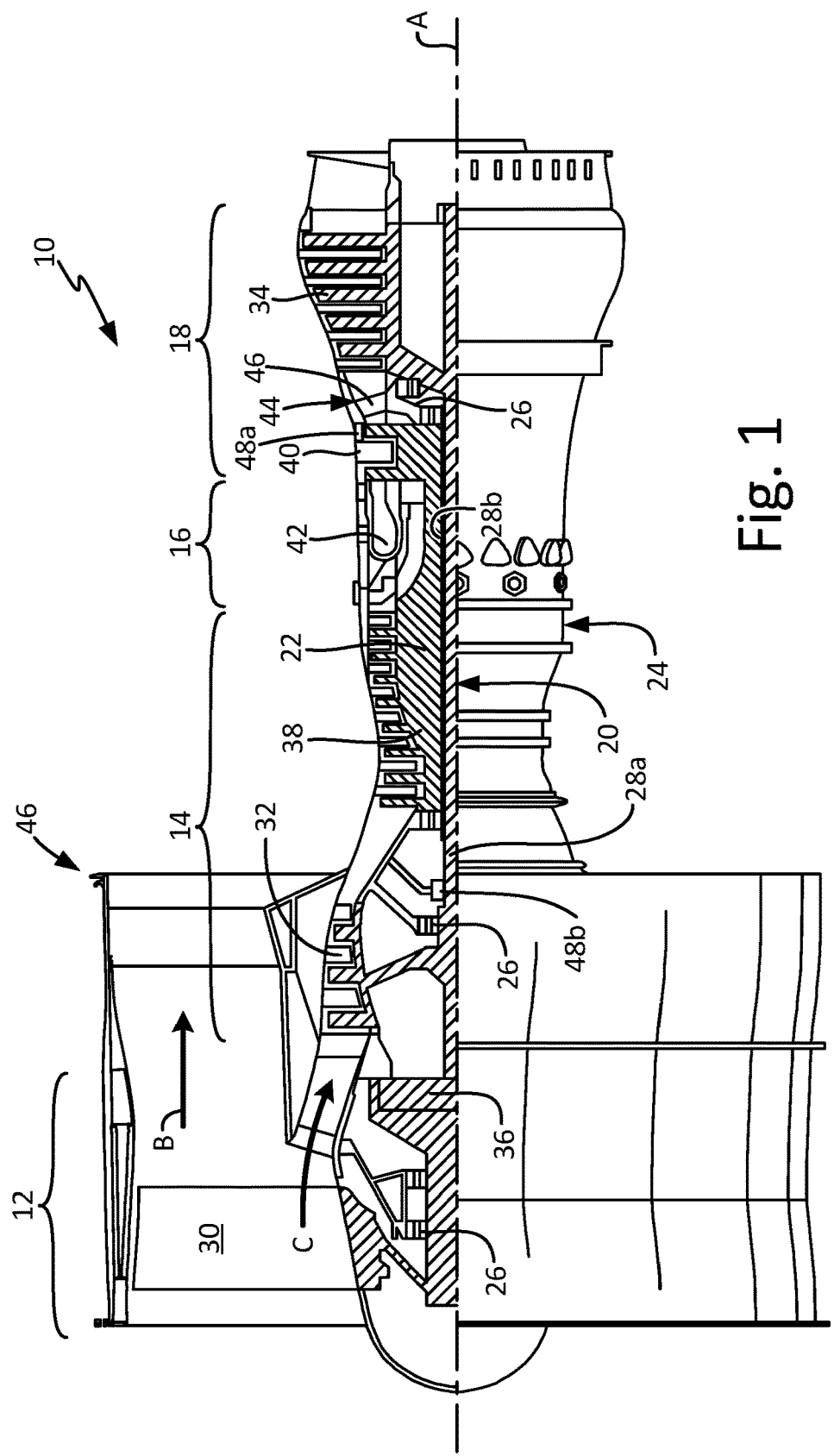
FIG. 1 is a partial cross-sectional view of a gas turbine engine.

FIG. 1 is a quarter-sectional view that schematically illustrates example gas turbine engine 10 that includes fan section 12, compressor section 14, combustor section 16 and turbine section 18. Alternative engines might include an augmenter section (not shown) among other systems or features. Fan section 12 drives air along bypass flowpath B while compressor section 14 draws air in along core flowpath C where air is compressed and communicated to combustor section 16. In combustor section 16, air is mixed with fuel and ignited to generate a high pressure exhaust gas stream that expands through turbine section 18 where energy is extracted and utilized to drive fan section 12 and compressor section 14.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 10 generally includes low speed spool 20 and high speed spool 22 mounted for rotation about center axis A of gas turbine engine 10 relative to engine static structure 24 via several bearing systems 26. It should be understood that various bearing systems 26 at various locations may alternatively or additionally be provided.

Low speed spool 20 generally includes inner shaft 28a that connects fan 30 and low pressure (or first) compressor section 32 to low pressure (or first) turbine section 34. Inner shaft 28 drives fan 30 through a speed change device, such as geared architecture 36, to drive fan 30 at a lower speed than low speed spool 20. High-speed spool 22 includes outer shaft 28b that interconnects high pressure (or second) compressor section 38 and high pressure (or second) turbine section 40. Inner shaft 28a and outer shaft 28b are concentric and rotate via bearing systems 26 about center axis A.

Combustor 42 is arranged between high pressure compressor 38 and high pressure turbine 40. In one example, high pressure turbine 40 includes at least two stages to provide double stage high pressure turbine 40. In another example, high pressure turbine 40 includes only a single stage. As used herein, a "high pressure" compressor or turbine experiences a higher pressure than a corresponding "low pressure" compressor or turbine.

The example low pressure turbine 34 has a pressure ratio that is greater than about 5. The pressure ratio of the example low pressure turbine 34 is measured prior to an inlet of low pressure turbine 34 as related to the pressure measured at the outlet of low pressure turbine 34 prior to an exhaust nozzle.

Mid-turbine frame 44 of engine static structure 24 can be arranged generally between high pressure turbine 40 and low pressure turbine 34. Mid-turbine frame 44 further supports bearing systems 26 in turbine section 18 as well as setting airflow entering the low pressure turbine 34.

The gas flow in core flowpath C is compressed first by low pressure compressor 32 and then by high pressure compressor 38, is mixed with fuel and ignited in combustor 42 to produce high speed exhaust gases, and the high speed exhaust gasses are then expanded through high pressure turbine 40 and low pressure turbine 34. Mid-turbine frame 44 includes vanes 46, which are in the core flowpath and function as an inlet guide vane for low pressure turbine 34. Utilizing vane 46 of mid-turbine frame 44 as the inlet guide vane for low pressure turbine 34 decreases the axial length of the low pressure turbine 34 without increasing the axial length of mid-turbine frame 44. Reducing or eliminating the number of vanes in low pressure turbine 34 shortens the axial length of turbine section 18. Thus, the compactness of gas turbine engine 10 is increased and a higher power density may be achieved.

The disclosed gas turbine engine 10 in one example is a high-bypass geared aircraft engine. In a further example, gas turbine engine 10 includes a bypass ratio greater than about six (6), with an example embodiment being greater than about ten (10). The example geared architecture 36 is an epicyclical gear train, such as a planetary gear system, star gear system or other known gear system, with a gear reduction ratio of greater than about 2.3.

In one disclosed embodiment, gas turbine engine 10 includes a bypass ratio greater than about ten (10:1) and the fan diameter is significantly larger than an outer diameter of low pressure compressor 32. It should be understood, however, that the above parameters are exemplary of one embodiment of a gas turbine engine including a geared architecture and that the present disclosure is applicable to other gas turbine engines.

Brush seals 48 are disposed between components of gas turbine engine 10 to prevent airflow from leaking between the components. In some examples, brush seal 48a can be disposed between relatively static components. For example, brush seal 48a can be disposed between a vane endwall and a blade outer air seal. In some examples, brush seal 48b can be disposed between relatively rotating components. For example, brush seal 48b can be disposed between a static structure of gas turbine engine 10 and one of inner shaft 28a and outer shaft 28b.

Figure 2:
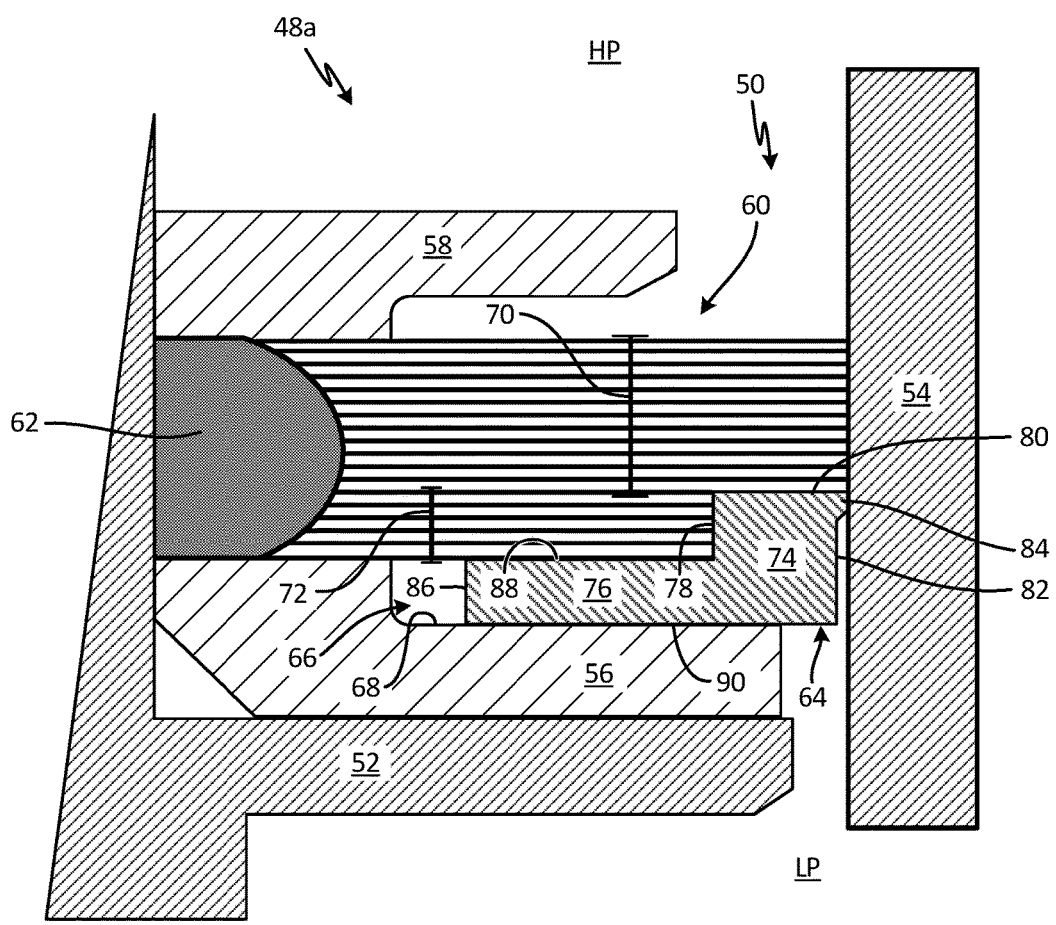
FIG. 2 is a cross-sectional view of an embodiment of a brush seal.

FIG. 2 is a cross-sectional view of brush seal 48a. Brush seal 48a is disposed in seal cavity 50 between first component 52 and second component 54 and is configured to prevent leakage of air or other gas through seal cavity 50. Brush seal 48a includes back plate 56, top plate 58, bristle pack 60, joint 62, sliding backing plate (SBP) 64, and chamber 66. Back plate 56 includes support surface 68. Bristle pack 60 includes first bristle set 70 and second bristle set 72. SBP 64 includes support portion 74 and sliding portion 76. Support portion 74 includes first inner face 78, support face 80, and contact face 82. Contact face 82 includes bulge 84. Sliding portion 76 includes second inner face 86, bristle-side face 88, and plate-side face 90.

Brush seal 48a extends circumferentially around center axis A (shown in FIG. 1). Bristle pack 60 is secured at joint 62 between top plate 58 and back plate 56. Sliding portion 76 of SBP 64 is disposed between bristle pack 60 and back plate 56, and support portion 74 of SBP 64 extends across seal cavity 50 and is configured to support a portion of first bristle set 70 extending into seal cavity 50. Plate-side face 90 of SBP 64 rides on support surface 68 of back plate 56, and SBP 64 is configured to slide relative to back plate 56. Chamber 66 is disposed adjacent second inner face 86 between back plate 56 and second bristle set 72, and chamber 66 receives sliding portion 76 to allow SBP 64 to slide to the left (when viewed from the perspective of FIG. 1) in response to seal cavity 50 contracting. Support portion 74 of SBP 64 extends from sliding portion 76 of SBP 64. Contact face 82 of SBP 64 is configured to maintain contact with second component 54 during operation of gas turbine engine 10 (shown in FIG. 1). Bulge 84 can extend from contact face 82 towards second component 54 and can contact second component 54. It is understood, however, that any portion of contact face 82 can maintain contact with second component 54. First component 52 and second component 54 can be relatively stationary components, such as vanes and blade outer air seals. Seal cavity 50 is an axial gap between first component 52 and second component 54 that extends circumferentially about center axis A. It is understood that seal cavity 50 can be an axial gap between first component 52 and second component 54, a radial gap between first component 52 and second component 54, or a combination thereof, such that seal cavity 50 extends both radially and axially. In any orientation, seal cavity 50 can extend circumferentially about center axis A.

Second bristle set 72 extends from joint 62 towards second component 54. Second bristle set 72 extends over bristle-side face 88 of SBP 64 and a distal end of second bristle set 72 contacts first inner face 78 of support portion 74. Second bristle set 72 is configured to exert a pushing force on first inner face 78, such that second bristle set 72 pushes SBP 64 into contact with second component 54. First bristle set 70 extends from joint 62 across seal cavity 50 towards second component 54. A distal end of first bristle set 70 is configured to contact second component 54 such that first bristle set 70 prevents air or other gas from leaking through seal cavity 50. At least a portion of first bristle set 70 extends over support portion 74 of SBP 64 and is disposed on support face 80 of support portion 74. Support portion 74 of SBP 64 provides support to first bristle set 70, thereby preventing first bristle set 70 from blowing over or otherwise displacing due to high pressure differentials and/or temperatures. First bristle set 70 and second bristle set 72 can be formed from a cobalt alloy or any other material that can withstand the high temperatures present in high pressure turbine section 40 (shown in FIG. 1) during engine operation. In addition, second bristle set 72 can include a series of bristle groups circumferentially spaced from one another to facilitate the sliding of SBP 64 (discussed in more detail in FIG. 9).

High-pressure region HP is disposed on a first side of seal cavity 50, and low-pressure region LP is disposed on a second side of seal cavity 50. First bristle set 70 extends across seal cavity 50 to prevent air and other gases from flowing from the high-pressure region HP to the low-pressure region LP through seal cavity 50. SBP 64 is configured to slide on back plate 56 such that contact face 82 maintains contact with second component 54 throughout operation. To maintain contact face 82 on second component 54, second bristle set 72 exerts the pushing force on first inner face 78, thereby driving SBP 64 towards second component 54 such that contact face 82 contacts second component 54. In some examples, second bristle set 72 is angled in the circumferential direction around center axis A (shown in FIG. 1), such that the pushing force is generated by the bristles of second bristle set 72 attempting to return to a more axial orientation.

During operation, first component 52 and second component 54 can move relative to each other such that seal cavity 50 actively expands and contracts. As seal cavity 50 expands, the pushing force generated by second bristle set 72 on first inner face 78 causes SBP 64 to slide across seal cavity 50 such that contact face 82 maintains contact with second component 54. As such, support face 80 continues to support first bristle set 70 such that there is little to no unsupported length of first bristle set 70. As seal cavity 50 contracts, second component 54 causes SBP 64 to slide into brush seal 48a. Chamber 66 can receive sliding portion 76 of SBP 64 when seal cavity 50 contracts. Chamber 66 can be of any desired size for receiving sliding portion 76. In some examples, chamber 66 can be equal to or greater than a difference between a width of a fully expanded seal cavity 50 and a width of a fully contracted seal cavity 50. Chamber 66 allowing SBP 64 to continue retracting into chamber 66 as seal cavity 50 contracts prevents clash between second component 54 and a hard stop of brush seal 48, such as back plate 56. SBP 64 does not present any hard stop against which second component 54 can clash. By maintaining contact with second component 54, SBP 64 minimizes any unsupported length of first bristle set 70 within seal cavity 50, thereby preventing first bristle set 70 from blowing over due to high temperatures and/or pressures.

In some examples, SBP 64 is formed from a lubricious material to reduce friction between SBP 64 and back plate 56. For example, SBP 64 can be cobalt or a cobalt-based alloy. In some examples, SBP 64 can include a lubricious coating configured to reduce friction resisting movement of SBP 64. For example, a coating can be applied to plate-side face 90 of SBP 64, to support surface 68 of back plate 56, or to both, to thereby reduce axial friction between SBP 64 and back plate 56. In a further example, a coating can be applied to bristle-side face 88 of SBP 64 to reduce axial friction between SBP 64 and second bristle set 72. SBP 64 can include any suitable coating for reducing the coefficient of friction of SBP 64.

Brush seal 48a provides significant advantages. SBP 64 maintains contact with second component 54 and slides on back plate 56 as seal cavity 50 expands and contracts. By sliding relative to back plate 56 such that contact face 82 maintains contact with second component 54 as seal cavity expands and contracts, SBP 64 minimizes any unsupported length of first bristle set 70 within seal cavity 50. Minimizing the unsupported length of first bristle set 70 allows brush seal 48a to operate in high temperature, high pressure-differential environments and within active seal cavities. Brush seal 48a also provides improved sealing. By minimizing the unsupported length of first bristle set 70, the bristles in first bristle set 70 can have a minimal diameter, which provides improved flexibility and reduces any leakage through first bristle set 70. Furthermore, SBP 64 prevents clash between second component 54 and brush seal 48a, as SBP 64 slides in response to seal cavity 50 contracting, thereby preventing damage to both brush seal 48a and second component 54.

Figure 3:
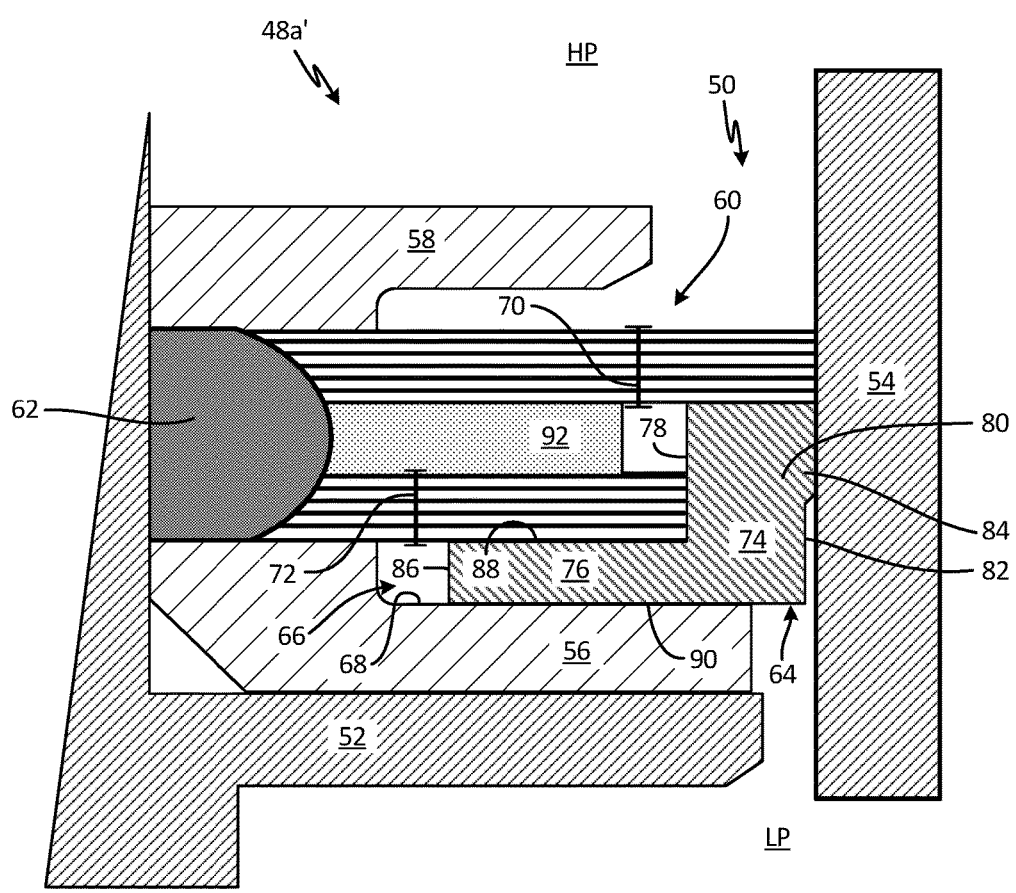
FIG. 3 is a cross-sectional view of a first alternate embodiment of a brush seal.

FIG. 3 is a cross-sectional view of brush seal 48a'. Brush seal 48a' is disposed in seal cavity 50 between first component 52 and second component 54. Brush seal 48a' includes back plate 56, top plate 58, bristle pack 60, joint 62, sliding backing plate (SBP) 64, chamber 66, and support plate 92. Back plate 56 includes support surface 68. Bristle pack 60 includes first bristle set 70 and second bristle set 72. SBP 64 includes support portion 74 and sliding portion 76. Support portion 74 includes first inner face 78, support face 80, and contact face 82. Contact face 82 includes bulge 84. Sliding portion 76 includes second inner face 86, bristle-side face 88, and plate-side face 90.

Brush seal 48a' extends circumferentially around center axis A (shown in FIG. 1) and is configured to prevent leakage of air and other gas through seal cavity 50. Bristle pack 60 is secured between top plate 58 and back plate 56 and extends from joint 62 towards second component 54. SBP 64 is disposed between bristle pack 60 and back plate 56 and is configured to slide relative to back plate 56. First bristle set 70 extends from joint 62, across seal cavity 50, and contacts second component 54. Support face 80 of SBP 64 provides support to first bristle set 70 to prevent first bristle set 70 from deforming and blowing over due to high pressure differentials between high pressure region HP and low pressure region LP and/or due to high temperatures. Second bristle set 72 extends over bristle-side face 88 of SBP 64 and contacts first inner face 78 of SBP 64. Second bristle set 72 exerts a pushing force on first inner face 78 to drive SBP 64 towards second component 54 and to maintain contact between contact face 82 and second component 54. Support plate 92 extends from joint 62 and is disposed between first bristle set 70 and second bristle set 72. Support plate 92 extends circumferentially around center axis A (shown in FIG. 1). Support plate 92 can be secured between first bristle set 70 and second bristle set 72 in any suitable manner, such as by welding or clamping.

During operation, support plate 92 provides radial support for a portion of first bristle set 70 extending over support plate 92, thereby reducing the radial load experienced by second bristle set 72. The fluid disposed in high-pressure region HP exerts a force on first bristle set 70. The force can be transferred to second bristle set 72 and thus to SBP 64, thereby increasing the friction between SBP 64 and back plate 56. Support plate 92 reduces the load transferred to second bristle set 72, and thus to SBP 64, by transferring the load to joint 62 instead of second bristle set 72. By reducing the load on SBP 64, support plate 92 also reduces the friction between second bristle set 72 and bristle-side face 88 and between plate-side face 90 and support surface 68. With reduced friction, less force is required to drive SBP 64 into contact with second component 54. As such, the bristles of second bristle set 72 can have a reduced diameter and stiffness while still ensuring that SBP 64 remains in contact with second component 54. The reduced diameter of second bristle set 72 allows second bristle set 72 to tolerate greater deflection between first component 52 and second component 54, such as the deflection caused by a more active seal cavity, such as seal cavity 50, without yielding and/or deforming. Support plate 92 can be formed from any suitable material that can be formed into a flat annular plate and that is able to withstand high temperatures during engine operation. For example, support plate 92 can be made from a nickel-based alloy, a hardenable nickel-based alloy, a cobalt-based alloy, or any other suitable material.

Brush seal 48a' provides significant advantages. Support plate 92 reduces radial loading on SBP 64, thereby reducing the friction acting against SBP 64. As such, less force is required to drive SBP 64 into contact with second component 54. Second bristle set 72 can thus have bristles with a smaller diameter and less stiffness, thereby reducing the manufacturing costs associated with brush seal 48a'. Moreover, reducing the friction acting on SBP 64 reduces wear, thereby increasing the useful life of brush seal 48a'. In addition, first bristle set 70 can also include smaller diameter bristles to provide improved sealing because SBP 64 supports first bristle set 70. As such, fewer bristles are required to provide similar sealing efficiency, such that brush seal 48a' can have a reduced size due to the reduced size and number of bristles.

Figure 4:
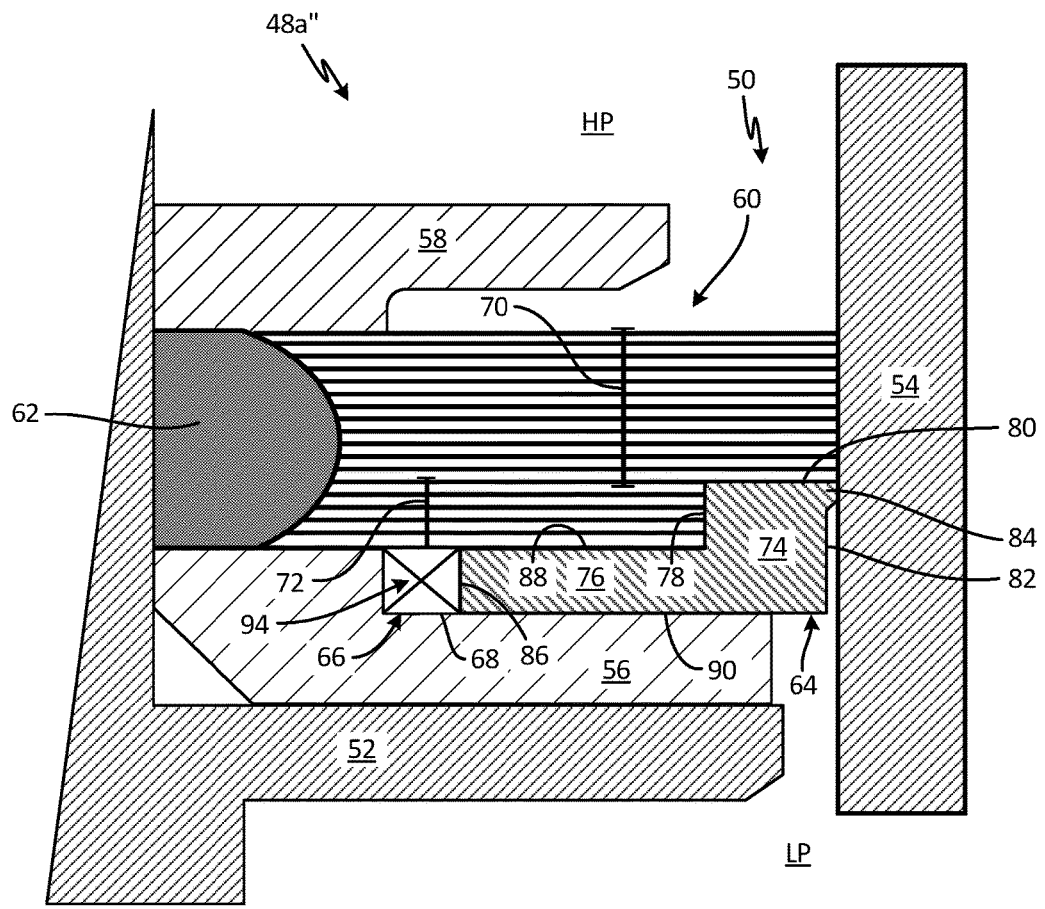
FIG. 4 is a cross-sectional view of a second alternate embodiment of a brush seal.

FIG. 4 is a cross-sectional view of brush seal 48a". Brush seal 48a" is disposed in seal cavity 50 between first component 52 and second component 54. Brush seal 48a" includes back plate 56, top plate 58, bristle pack 60, joint 62, sliding backing plate (SBP) 64, chamber 66, and slide assist 94. Back plate 56 includes support surface 68. Bristle pack 60 includes first bristle set 70 and second bristle set 72. SBP 64 includes support portion 74 and sliding portion 76. Support portion 74 includes first inner face 78, support face 80, and contact face 82. Contact face 82 includes bulge 84. Sliding portion 76 includes second inner face 86, bristle-side face 88, and plate-side face 90.

Brush seal 48a" extends circumferentially around center axis A (shown in FIG. 1) and is configured to prevent leakage of air and other gas through seal cavity 50. Bristle pack 60 is secured between top plate 58 and back plate 56 and extends from joint 62 towards second component 54. SBP 64 is disposed between bristle pack 60 and back plate 56 and is configured to slide relative to back plate 56. First bristle set 70 extends from joint 62, across seal cavity 50, and contacts second component 54. Support face 80 of SBP 64 provides support to first bristle set 70 to prevent first bristle set 70 from deforming and blowing over due to high pressure differentials between high pressure region HP and low pressure region LP and/or due to high temperatures. Second bristle set 72 extends over bristle-side face 88 of SBP 64 and contacts first inner face 78 of SBP 64. Second bristle set 72 exerts a first pushing force on first inner face 78 to drive SBP 64 towards second component 54 and to maintain contact between contact face 82 and second component 54. Slide assist 94 is disposed in chamber 66 adjacent second inner face 86. Slide assist 94 is configured to exert a second pushing force on second inner face 86 of SBP 64, to drive SBP 64 across seal cavity 50 such that contact face 82 contacts second component 54. In some examples, slide assist 94 can be mechanical and can be of any suitable configuration for generating the second pushing force. For example, slide assist 94 can be a spring, such as a wave spring, disposed in chamber 66.

During operation, first component 52 and second component 54 can move relative to each other such that seal cavity 50 expands and contracts. Second bristle set 72 is configured to exert the first pushing force on first inner face 78 to drive SBP 64 towards second component and to maintain contact between contact face 82 and second component 54. Slide assist 94 exerts the second pushing force on second inner face 86 of SBP 64 to force SBP 64 towards second component 54. The first pushing force and the second pushing force act together to drive SBP 64 towards second component 54 and maintain contact between contact face 82 and second component 54. Maintaining contact face 82 in contact with second component 54 minimizes any unsupported length of first bristle set 70, as support face 80 provides support for first bristle set 70. SBP 64 thus extends across seal cavity 50 and supports the length of first bristle set 70, thereby preventing first bristle set 70 from blowing over or deforming.

While brush seal 48a" is described as including a mechanical slide assist 94, it is understood that brush seal 48a" can include any desired number and configuration of slide assists 94 to maintain SBP 64 in contact with second component 54. For example, brush seal 48a" can include both a mechanical slide assist, such as a spring, and a pneumatic slide assist, such as slide assist 94' (discussed in more detail in FIG. 5). In another example, brush seal 48a" can include the mechanical slide assist and a support plate, such as support plate 92 (FIG. 4). In yet another example, brush seal 48a" can include the mechanical slide assist, the pneumatic slide assist, and the support plate. It is thus understood that brush seal 48a" can include any desired number and arrangement of slide assists 94 to generate the second pushing force. In a further example, brush seal 48a" can include a single bristle set and slide assist 94. For example, first bristle set 70 can extend across seal cavity 50 to provide sealing, and SBP 64 can support a full extent of first bristle set 70. Slide assist 94 can then provide the full pushing force required to drive SBP 64 into contact with second component 54.

Figure 5:
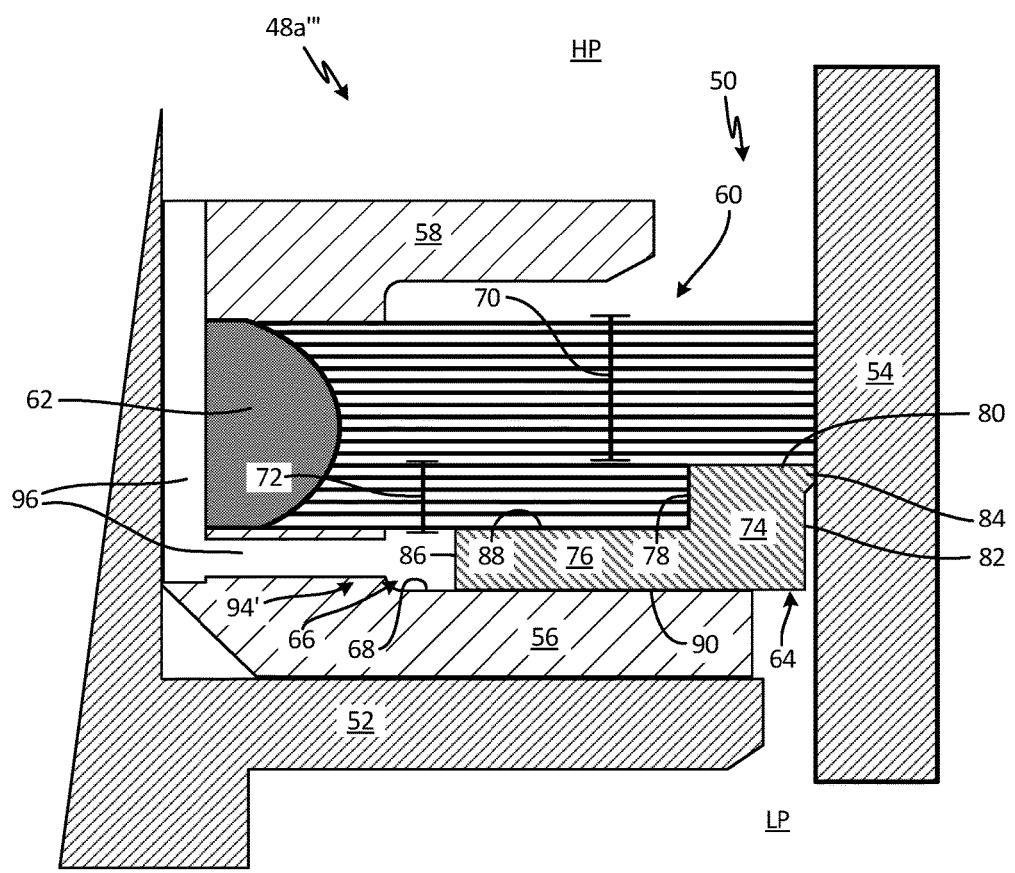
FIG. 5 is a cross-sectional view of a third alternate embodiment of a brush seal.

Brush seal 48a" provides significant advantages. Slide assist 94 provides additional force to push SBP 64 into seal cavity 50 and overcome the friction between SBP 64 and second bristle set 72 and between SBP 64 and back plate 56. As such, second bristle set 72 requires less stiffness to drive SBP 64, thereby reducing the manufacturing costs associated with brush seal 48a". Moreover, brush seal 48a" can also include fewer bristles in second bristle set 72 to generate the same overall pushing force, due to the second pushing force from slide assist 94, thereby reducing manufacturing costs, and the bristles of second bristle set 72 can include a reduced diameter. The reduced diameter of second bristle set 72 allows second bristle set 72 to tolerate greater deflection between first component 52 and second component 54, such as the deflection caused by a more active seal cavity, such as seal cavity 50, without yielding and/or deforming FIG. 5 is a cross-sectional view of brush seal 48a'''. Brush seal 48a''' is disposed in seal cavity 50 between first component 52 and second component 54 and extends circumferentially about center axis A (shown in FIG. 1). Brush seal 48a''' includes back plate 56, top plate 58, bristle pack 60, sliding backing plate (SBP) 64, chamber 66, and slide assist 94'. Back plate 56 includes support surface 68. Bristle pack 60 includes first bristle set 70 and second bristle set 72. SBP 64 includes support portion 74 and sliding portion 76. Support portion 74 includes first inner face 78, support face 80, and contact face 82. Contact face 82 includes bulge 84. Sliding portion 76 includes second inner face 86, bristle-side face 88, and plate-side face 90.

Brush seal 48a''' extends circumferentially around center axis A (shown in FIG. 1) and is configured to prevent leakage of air and other gas through seal cavity 50. Bristle pack 60 is secured between top plate 58 and back plate 56 and extends from joint 62 towards second component 54. SBP 64 is disposed between bristle pack 60 and back plate 56 and is configured to slide relative to back plate 56. First bristle set 70 extends from joint 62, across seal cavity 50, and contacts second component 54. Support face 80 of SBP 64 provides support to first bristle set 70 to prevent first bristle set 70 from deforming and blowing over due to high pressure differentials between high pressure region HP and low pressure region LP and/or due to high temperatures. Second bristle set 72 extends over bristle-side face 88 of SBP 64 and contacts first inner face 78 of SBP 64. Second bristle set 72 exerts a first pushing force on first inner face 78 to drive SBP 64 towards second component 54 and to maintain contact between contact face 82 and second component 54.

Slide assist 94' is configured to exert a second pushing force on SBP 64 to drive SBP 64 into contact with second component 54. Chamber 66 is disposed adjacent second inner face 86 of SBP 64. Flow passages 96 extend though brush seal 48a''' and are in flow communication with chamber 66. Flow passages 96 are configured to provide a pressurized fluid, such as air from high-pressure region HP, to chamber 66. In some examples, flow passages 96 can be channels integral with and extending through brush seal 48a'''. In some examples, brush seal 48a''' can be spaced from first component 52 such that a radial portion of flow passages 96 is formed between brush seal 48a''' and first component 52, and an axial portion of flow passages 96 extends through brush seal 48a''' to fluidly connect the radial portion and chamber 66. For example, flow passages 96 can include a plurality of individual bores through brush seal 48a'''. In some examples, the vertical portion of flow passages 96 can include a slot configured to supply pressurized fluid to multiple bores of the horizontal portion. It is understood, however, that flow passages 96 be of any suitable form for supplying the pressurized fluid to chamber 66. The pressurized fluid provided to chamber 66 through flow passages 96 generates the second pushing force on second inner face 86 of SBP 64 to push SBP 64 towards second component 54.

During operation, first component 52 and second component 54 can move relative to each other such that seal cavity 50 expands and contracts. Second bristle set 72 is configured to generate the first pushing force on first inner face 78 of support portion 74 to push SBP 64 towards second component 54. Slide assist 94' is configured to pneumatically generate the second pushing force in chamber 66 such that the second pushing force acts on second inner face 86 of SBP 64 to drive SBP 64 towards second component 54. The first pushing force and the second pushing force combine to drive SBP 64 towards second component 54, thereby maintaining contact between contact face 82 and second component 54 and minimizing any unsupported length of first bristle set 70.

While brush seal 48a''' is described as including slide assist 94', it is understood that brush seal 48a''' can include any desired configuration and number of slide assists 94' to drive SBP 64 across seal cavity 50 and to maintain contact face 82 in contact with second component 54. For example, brush seal 48a''' can include both a pneumatic slide assist, such as slide assist (FIG. 5), and a pneumatic slide assist 94'. For example, brush seal 48a''' can include flow passages 96 for conveying high pressure air to chamber 66 and can include a spring disposed in chamber 66. In another example, brush seal 48a''' can include the pneumatic slide assist and a support plate, such as support plate 92 (FIG. 4). In yet another example, brush seal 48a''' can include the mechanical slide assist, the pneumatic slide assist, and the support plate. It is thus understood that brush seal 48a''' can include any desired number and arrangement of slide assists 94. In a further example, brush seal 48a'' can include a single bristle set and slide assist 94'. For example, first bristle set 70 can extend across seal cavity 50 to provide sealing, and SBP 64 can support a full extent of first bristle set 70. Slide assist 94' can then provide the full pushing force required to drive SBP 64 into contact with second component 54.

Brush seal 48a''' provides significant advantages. The pressurized fluid in chamber 66 provides additional force to overcome the friction between SBP 64 and second bristle set 72 and between SBP 64 and back plate 56. As such, second bristle set 72 requires less stiffness to drive SBP 64, thereby reducing the manufacturing costs associated with brush seal 48a''. Moreover, brush seal 48a''' can also include fewer bristles in second bristle set 72 to generate the same overall pushing force, due to the second pushing force from slide assist 94', thereby reducing manufacturing costs. Furthermore, slide assist 94' being pneumatic allows slide assist 94' to provide additional pushing force without any additional mechanical components, thereby reducing cost and simplifying manufacturing.

Figure 6:
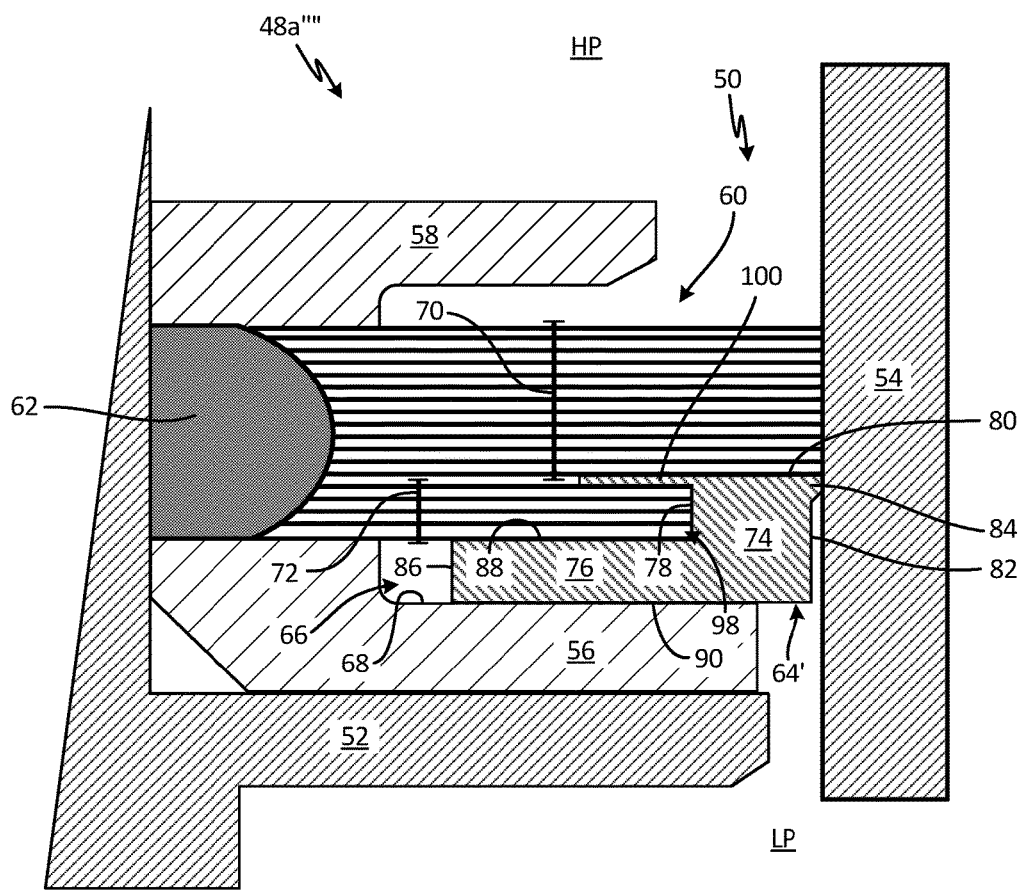
FIG. 6 is a cross-sectional view of a fourth alternate embodiment of a brush seal.

FIG. 6 is a cross-sectional view of brush seal 48a''''. Brush seal 48a'''' is disposed in seal cavity 50 between first component 52 and second component 54. Brush seal 48a'' includes back plate 56, top plate 58, bristle pack 60, joint 62, SBP 64', and chamber 66. Back plate 56 includes support surface 68. Bristle pack 60 includes first bristle set 70 and second bristle set 72. SBP 64' includes support portion 74, sliding portion 76, and slot 98. Support portion 74 includes first inner face 78, support face 80, contact face 82, and upper land 100. Contact face 82 includes bulge 84. Sliding portion 76 includes second inner face 86, bristle-side face 88, and plate-side face 90.

Brush seal 48a'''' extends circumferentially around center axis A (shown in FIG. 1) and is configured to prevent leakage of air and other gas through seal cavity 50. Bristle pack 60 is secured between top plate 58 and back plate 56 and extends from joint 62 towards second component 54. SBP 64' is disposed between bristle pack 60 and back plate 56 and is configured to slide relative to back plate 56 such that contact face 82 maintains contact with second component 54 during operation. First bristle set 70 extend over support face 80 of SBP 64' into seal cavity 50, and is configured to contact second component 54 to prevent air and other gases from leaking through seal cavity 50. Support face 80 of SBP 64' provides support to first bristle set 70, thereby preventing first bristle set 70 from deforming and blowing over due to high pressure differentials and temperatures. Second bristle set 72 extends over bristle-side face 88 of SBP 64' and contacts first inner face 78 of SBP 64'. Upper land 100 extends from first inner face 78 of support portion 74. Upper land 100 extends between first bristle set 70 and second bristle set 72. Slot 98 is disposed between upper land 100 and bristle-side face 88, and is configured to receive a distal portion of second bristle set 72. Upper land 100 separates first bristle set 70 and second bristle set 72, and as such upper land 100 prevents entanglement between first bristle set 70 and second bristle set 72. Upper land 100 allows a longer bristle length in second bristle set 72 and allows for a longer length of support face 80, thereby providing additional support to first bristle set 70.

SBP 64' provides significant advantages. During operation, first component 52 and second component 54 can move relative to each other such that seal cavity 50 expands and contracts. Second bristle set 72 exerts a force on first inner face 78 to push SBP 64' towards second component 54, thereby minimizing any unsupported length of first bristle set 70. Upper land 100 prevents first bristle set 70 and second bristle set 72 from becoming entangled as SBP 64' shifts within seal cavity 50, and reducing entanglement increases the lifespan of brush seal 48a''''.

Figure 7:
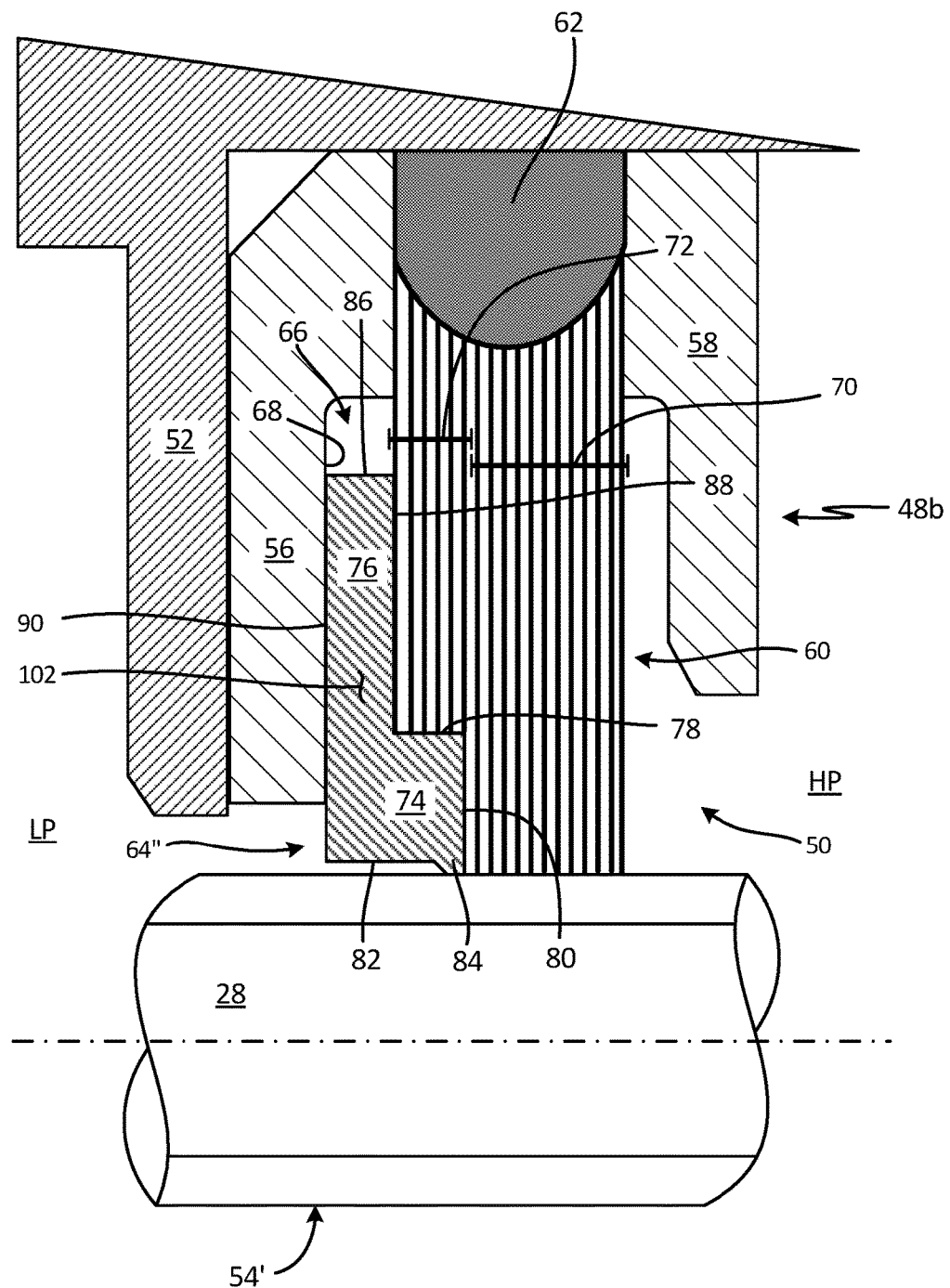
FIG. 7 is a cross-sectional view of an embodiment of a brush seal.

FIG. 7 is a cross-sectional view of brush seal 48b. Brush seal 48b is circumferentially disposed in seal cavity 50 between first component 52 and second component 54'. Second component 54' is configured to rotate relative to first component 52. In some examples, second component 54' can be a rotating shaft, such as shaft 28a (FIG. 1) and shaft 28b (FIG. 1). Brush seal 48b includes back plate 56, top plate 58, bristle pack 60, joint 62, SBP 64", and chamber 66. Back plate 56 includes support surface 68. Bristle pack 60 includes first bristle set 70 and second bristle set 72. SBP 64" includes SBP segments 102. Each SBP subassembly 102 includes support portion 74 and sliding portion 76. Support portion 74 includes first inner face 78, support face 80, and contact face 82. Contact face 82 includes bulge 84. Sliding portion 76 includes second inner face 86, bristle-side face 88, and plate-side face 90.

Brush seal 48b extends circumferentially around center axis A (shown in FIG. 1) and is configured to prevent leakage of air and other gas through seal cavity 50. Bristle pack 60 is secured between top plate 58 and back plate 56 and extends from joint 62 towards second component 54'. SBP 64" is disposed between bristle pack 60 and back plate 56 and is configured to slide relative to back plate 56 such that contact face 82 maintains contact with or close proximity to shaft 28 during operation, thereby ensuring support for first bristle set 70. First bristle set 70 extends from joint 62, across seal cavity 50, and contacts second component 54'. Support face 80 provides support to first bristle set 70 to prevent first bristle set 70 from deforming and blowing over due to high pressure differentials between high pressure region HP and low pressure region LP and/or due to high temperatures. Second bristle set 72 extends over bristle-side face 88 and contacts first inner face 78 of SBP 64. Second bristle set 72 exerts a pushing force on first inner face 78 to drive SBP segment 102 towards second component 54' and to maintain contact between contact face 82 and shaft 28. In some examples, SBP segments 102 can be in a shiplap configuration, whereby a plurality of individual SBP segments 102 (only one of which is shown) extend partially about the circumference of shaft 28. The plurality of individual SBP subassemblies 102 are lapped onto each other to form the full ring SBP 64". Lapping the plurality of SBP segments 102 allows brush seal 48b to react to relative thermal and mechanical deflections and vibration in shaft 28, thereby ensuring that SBP 64" provides support to first bristle set 70 throughout operation.

Brush seal 48b provides significant advantages. Each SBP subassembly 102, and thus SBP 64", maintains contact with second component 54' and slides on back plate 56 as seal cavity 50 expands and contracts. By expanding and contracting with seal cavity 50, SBP 64" minimizes any unsupported length of first bristle set 70 within seal cavity 50. Brush seal 48b also provides improved sealing. By minimizing the unsupported length of first bristle set 70, the bristles in first bristle set 70 can have a minimal diameter, which provides improved flexibility and reduces any leakage through first bristle set 70. Furthermore, SBP 64 prevents clash between second component 54 and brush seal 48b, as SBP 64 slides in response to seal cavity 50 expanding and contracting, thereby preventing contact between a hard stop and second component 54'.

Figure 8B:
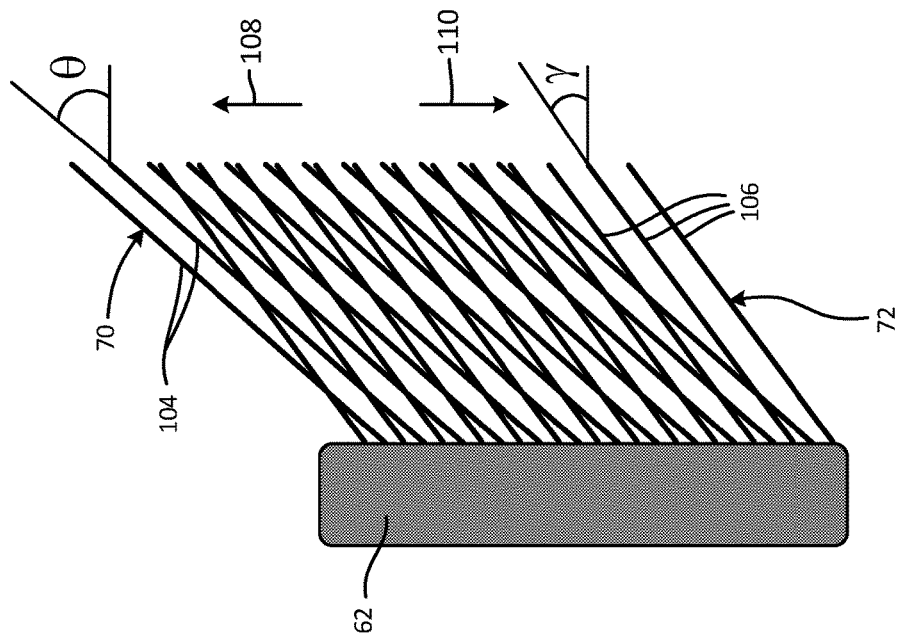
FIG. 8B is a top view of a first bristle set and a second bristle set.
Figure 8A:
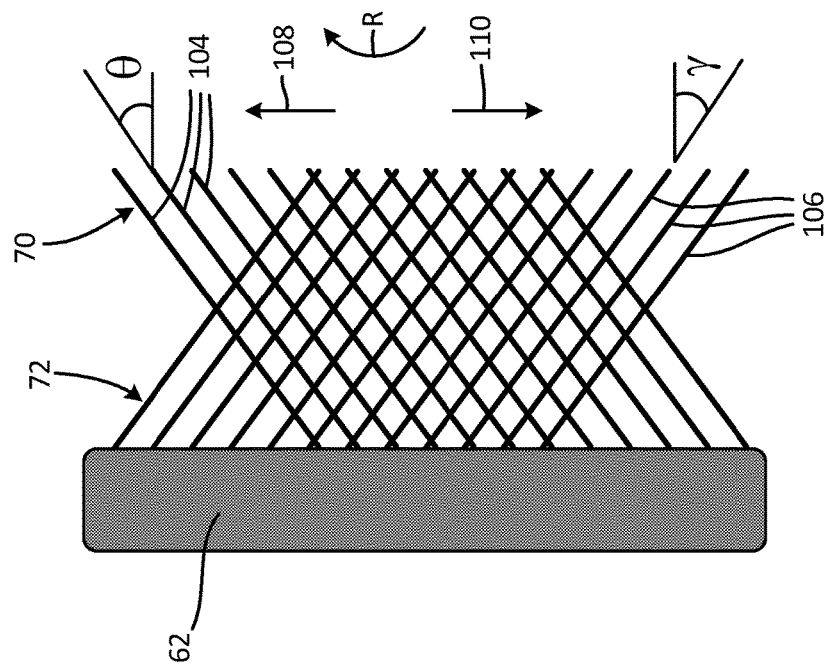
FIG. 8A is a top view of a first bristle set and a second bristle set.

FIG. 8A is a top view of first bristle set 70 and second bristle set 72 in a first relative orientation. FIG. 8B is a top view of first bristle set 70 and second bristle set 72 in a second relative orientation. FIGS. 8A and 8B will be discussed together. First bristle set 70 includes first bristles 104 extending from joint 62 at first lay angle θ. Second bristle set 72 includes second bristles 106 extending from joint 62 at second lay angle γ. First bristle set 70 extends from a brush seal; such as brush seal 48a (shown in FIG. 2), brush seal 48a' (shown in FIG. 3), brush seal 48a" (shown in FIG. 4), brush seal 48a''' (shown in FIG. 5), brush seal 48a'''' (shown in FIG. 6), and brush seal 48b (shown in FIG. 7); and is configured to seal a seal cavity, such as seal cavity 50 (shown in FIGS. 2-7), to prevent air and other gases from leaking through the seal cavity. Second bristle set 72 extends from the brush seal and is configured to engage with and exert a force on a sliding backing plate, such as SBP 64 (best seen in FIG. 3), SBP 64' (shown in FIG. 6), and SBP 64" (shown in FIG. 7). To prevent entanglement, first bristle set 70 can be angled relative to second bristle set 72. Where first bristle set 70 contacts a rotating element, such as shaft 28 (best seen in FIG. 7), first bristle set 70 is oriented in the direction of rotation of the rotating element (indicated by arrow R in FIG. 8A). First bristles 104 and second bristles 106 can be wire bristles and can be formed from a cobalt alloy or any other material that can withstand the high temperatures present in high pressure turbine section 40 (shown in FIG. 1) or any other section of gas turbine engine 10 (shown in FIG. 1) that the brush seal is disposed in during engine operation.

In FIG. 8A, first bristle set 70 has a first lay angle oriented in first circumferential direction 108 and second bristle set 72 has a second lay angle oriented in second circumferential direction 110. Angling first bristle set 70 and second bristle set 72 in opposite circumferential directions reduces entanglement between first bristle set 70 and second bristle set 72. In FIG. 8B, first bristle set 70 is angled at first lay angle θ and extend in first circumferential direction 102, and second bristle set 72 is angled at second lay angle γ, different than first lay angle θ, and similarly extend in first circumferential direction 108. Differing first lay angle θ and second lay angle γ prevents entanglement between first bristle set 70 and second bristle set 72. Reducing entanglement between first bristle set 70 and second bristle set 72 increases the lifespan of the bristles and thus of the brush seal.

Figure 9:
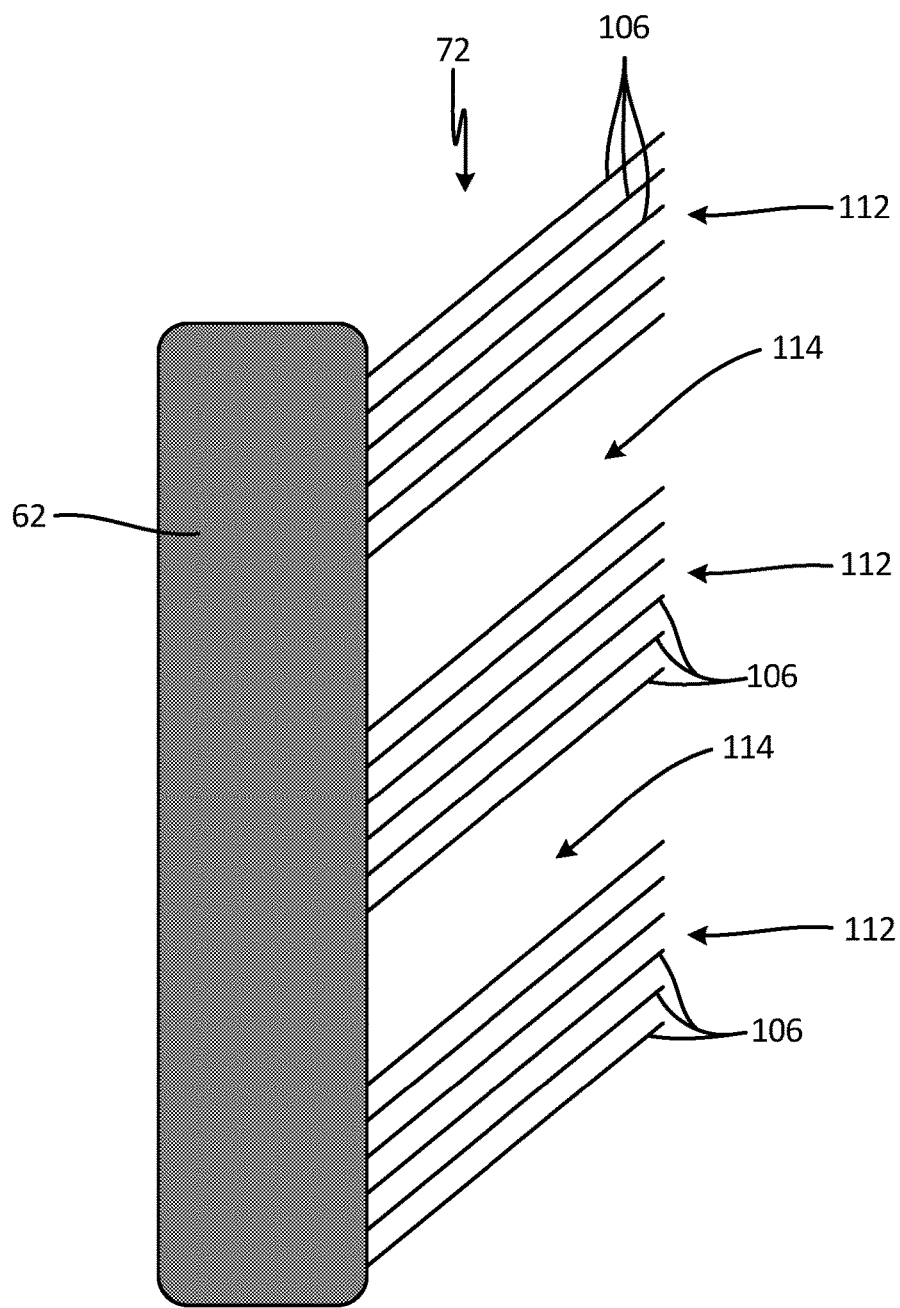
FIG. 9 is a top view of a second bristle set.

FIG. 9 is a top view of second bristle set 72. Second bristle set 72 includes second bristles 106 extending from joint 62. Second bristles 106 are disposed in bristle groups 112 with gap 114 disposed between each bristle group 112. Gaps 114 extend circumferentially and provide space for bristle groups 112 of second bristle set 72 to compress towards joint 62. For example, as a sliding backing plate; such as SBP 64 (best seen in FIG. 3), SBP 64' (shown in FIG. 6), and SBP 64" (shown in FIG. 7); contracts into a brush seal; such as brush seal 48a (shown in FIG. 2), brush seal 48a' (shown in FIG. 3), brush seal 48a" (shown in FIG. 4), brush seal 48a''' (shown in FIG. 5), brush seal 48a'''' (shown in FIG. 6) and brush seal 48b (shown in FIG. 7); each bristle group 112 displaces into gaps 114. Gaps 114 allow each bristle group 112 to contract in response to a the SBP being displaced by the active seal cavity, while preventing second bristles 106 from expanding into the SBP or a first bristle set, such as first bristle set 70 (shown in FIGS. 2-7). As such, gaps 114 prevent entanglement between the first bristle set and second bristle set 72. Reducing entanglement increases the lifespan of the bristles and thus of the brush seal. Moreover, gaps 114 prevent wear to second bristles 106 that could occur due to expansion into the SBP or the first bristle set, further increasing the lifespan of second bristle set 72.

Figure 10:
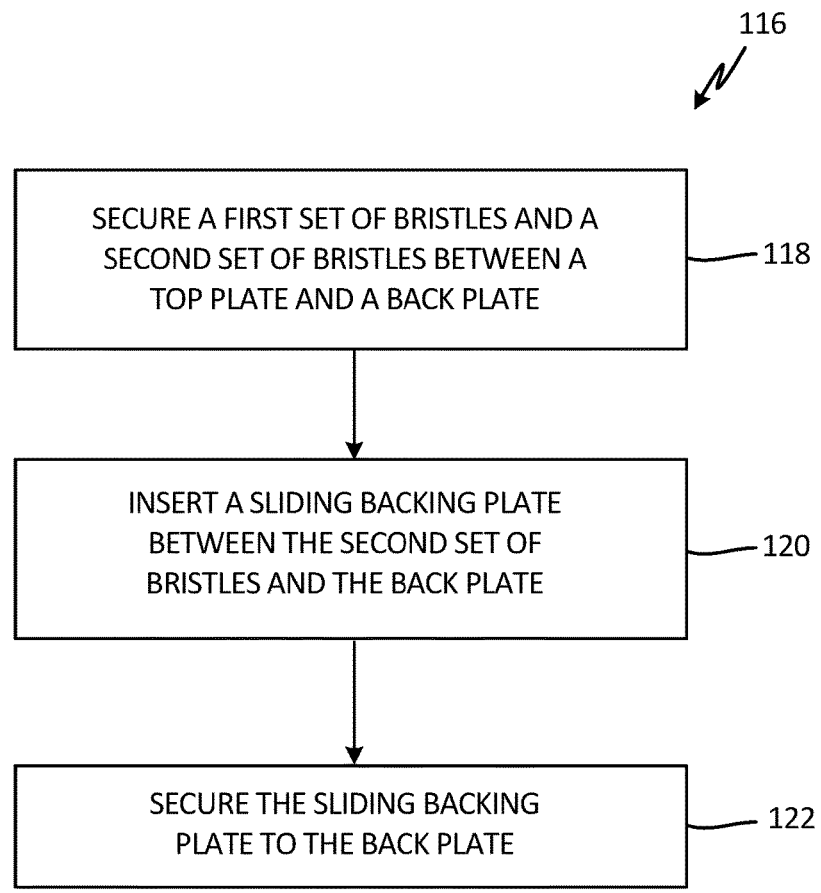
FIG. 10 is a flow chart of a method of assembling a brush seal.

FIG. 10 is a flow chart depicting method 116 of assembling a brush seal. In step 118, a first set of bristles, such as first bristle set 70 (shown in FIGS. 2-8B), and a second set of bristles, such as second bristle set 72 (shown in FIGS. 2-8B), are secured between a top plate, such as top plate 58 (shown in FIGS. 2-7), and a back plate, such as back plate 56 (shown in FIGS. 2-7). In some examples, the first set of bristles and the second set of bristles are clamped together with the top plate and the back plate. In some examples, the first set of bristles and the second set of bristles are welded together with the top plate and the back plate. It is understood, however, that the first set of bristles and the second set of bristles can be secured between the top plate and the bottom plate in any desired manner.

In step 120, a sliding backing plate (SBP), such as SBP 64 (best seen in FIG. 2), is inserted into the brush seal with at least a portion of the SBP extending into a gap disposed between the second set of bristles and the back plate, such as support portion 74 (shown in FIGS. 2-7). The SBP is positioned such that the second bristles interface with an inner radial surface of the SBP, such as first inner face 78 (shown in FIGS. 2-7), and such that the first set of bristles are supported on an outer axial surface of the SBP, such as support face 80 (shown in FIGS. 2-6), or an aft radial surface of the SBP, such as support face 80 (shown in FIG. 7).

In step 122, the SBP is secured to the back plate. The SBP is secured to the back plate to ease installation of the assembled brush seal. By securing the SBP to the back plate, the SBP is prevented from sliding out of the gap between the second set of bristles and the back plate until the brush seal is properly positioned and installed. In one example, an adhesive, such as a cyanoacrylate adhesive, can be applied to an interface between the back plate and the SBP. For example the adhesive can be applied at the intersection between an outer face of the back plate and the plate-side face of the SBP, such as plate-side face 90, to prevent the SBP from sliding relative to the back plate during installation. The adhesive is configured to vaporize at the operating temperatures experienced by the brush seal. As such, the SBP is detached from and able to slide relative to the back plate when the brush seal is in an active operating environment.

Discussion of Possible Embodiments

The following are non-exclusive descriptions of possible embodiments of the present invention.

A brush seal includes a top plate, a back plate, a bristle pack secured at a joint between the top plate and the back plate, and a sliding backing plate. The bristle pack includes a first bristle set extending from the joint and a second bristle set extending from the joint. The sliding backing plate includes a sliding portion disposed between the back plate and the second bristle set; and a support portion having an inner face and a support face, the inner face contacting a distal end of the second bristles, and the support face disposed below and configured to support at least a portion of the first bristle set. The sliding backing plate is configured to slide relative to the back plate.

The brush seal of the preceding paragraph can optionally include, additionally and/or alternatively, any one or more of the following features, configurations and/or additional components:

The second bristle set is configured to exert a first pushing force on an inner face of the support portion to drive the sliding backing plate relative to the back plate.

A chamber disposed between an inner face of the sliding portion, the second bristle set, and the back plate.

A slide assist configured to exert a second pushing force on an inner face of the sliding portion to drive the sliding backing plate relative to the back plate.

The slide assist comprises a spring disposed within the chamber.

The slide assist comprises at least one flow passage extending through the brush seal and in flow communication with the chamber, the at least one flow passage configured to provide a pressurized fluid to the chamber, wherein the pressurized fluid generated the second pushing force.

The sliding backing plate further includes a land extending from the inner face and disposed between the first bristle set and the second bristle set; and a slot defined by the land, the inner face, and the sliding portion, wherein the second bristle set at least partially disposed within the slot.

A support plate secured to the joint and extending between the first bristle set and the second bristle set.

The first bristle set is angled in a first circumferential direction, and the second bristle set is angled in a second circumferential direction opposite the first circumferential direction.

The first bristle set extends from the joint at a first lay angle, and the second bristle set extends from the joint at a second lay angle different from the first lay angle.

A gas turbine engine includes a first engine component, a second engine component, a seal cavity extending between the first engine component and the second engine component, and a brush seal secured to the first engine component. The brush seal includes a top plate, a back plate, a bristle pack secured at a joint between the top plate and the back plate, and a sliding backing plate. The bristle pack includes a first bristle set extending from the joint across the seal cavity toward the second engine component and configured to contact the second engine component and a second bristle set extending from the joint towards the second engine component. The sliding backing plate includes a sliding portion disposed between the back plate and the second bristle set; and a support portion having an inner face, a support face, and a contact face, the inner face contacting a distal end of the second bristles, the support face disposed below and configured to support at least a portion of the first bristle set, and the contact face contacting the second engine component. The sliding backing plate is configured to slide relative to the back plate to maintain contact between the contact face and the second engine component and the second bristle set is configured to exert a first pushing force on an inner face of the support portion to drive the sliding backing plate into contact with the second engine component.

The gas turbine engine of the preceding paragraph can optionally include, additionally and/or alternatively, any one or more of the following features, configurations and/or additional components:

A slide assist configured to exert a second pushing force on an inner face of the sliding portion to drive the sliding backing plate relative to the back plate.

The slide assist comprises a spring disposed within the chamber.

The slide assist includes a radial flow passage disposed between the brush seal and the first engine component and an axial flow passage extending from the radial flow passage to a chamber, the chamber disposed between an inner face of the sliding portion, the second bristle set, and the back plate. The radial flow passage and the axial flow passage are configured to provide a pressurized fluid to the chamber to generate the second pushing force.

The sliding backing plate further includes a land extending from the inner face and disposed between the first bristle set and the second bristle set and a slot defined by the land, the inner face, and the sliding portion, wherein the second bristle set at least partially disposed within the slot.

A support plate secured to the joint and extending between the first bristle set and the second bristle set.

The first bristle set is angled in a first circumferential direction, and the second bristle set is angled in a second circumferential direction opposite the first circumferential direction.

The first bristle set extends from the joint at a first lay angle, and the second bristle set extends from the joint at a second lay angle different from the first lay angle.

The second component comprises a rotating shaft, and the sliding backing plate comprises a plurality of sliding backing plate subassemblies lapped together to form the sliding backing plate.

A method of assembling a brush seal inside a seal cavity between a first engine component and a second engine component, the method includes securing a first bristle set and a second bristle set between a top plate and a back plate; inserting a sliding portion of a sliding backing plate between the second bristle set and the back plate such that a distal end of the second bristles contacts and exerts a force on an inner face of a support portion of the sliding backing plate, and such that a support face of the sliding backing plate is disposed adjacent the first bristle set; securing the sliding backing plate to the back plate with an adhesive configured to vaporize at an operating temperature within the seal cavity; and attaching the brush seal to the first engine component such that the first bristle set extends into the seal cavity and contacts the second engine component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A brush seal comprising:
   a top plate;
   a back plate;
   a bristle pack secured at a joint between the top plate and the back plate, the bristle pack comprising:
      a first bristle set extending from the joint; and
      a second bristle set extending from the joint; and
   a sliding backing plate comprising:
      a sliding portion disposed between the back plate and the second bristle set; and
      a support portion having an inner face and a support face, the inner face contacting a distal end of the second bristle set, and the support face disposed adjacent and configured to support at least a portion of the first bristle set;
   wherein the sliding backing plate is configured to slide relative to the back plate; and
   wherein the second bristle set is configured to exert a first pushing force on the inner face of the support portion to drive the sliding backing plate relative to the back plate.

2. The brush seal of claim 1, further comprising:
   a chamber disposed between an inner face of the sliding portion, the second bristle set, and the back plate.

3. The brush seal of claim 2, further comprising:
   a slide assist configured to exert a second pushing force on the inner face of the sliding portion to drive the sliding backing plate relative to the back plate.

4. The brush seal of claim 3, wherein the slide assist comprises a spring disposed within the chamber.

5. The brush seal of claim 3, wherein the slide assist comprises:
   at least one flow passage extending through the brush seal and in flow communication with the chamber, the at least one flow passage configured to provide a pressurized fluid to the chamber, wherein the pressurized fluid generates the second pushing force.

6. The brush seal of claim 1, wherein the sliding backing plate further comprises:
   a land extending from the inner face and disposed between the first bristle set and the second bristle set; and
   a slot defined by the land, the inner face, and the sliding portion, wherein the second bristle set is at least partially disposed within the slot.

7. The brush seal of claim 1, further comprising:
   a support plate secured to the joint and extending between the first bristle set and the second bristle set.

8. The brush seal of claim 1, wherein the first bristle set is angled in a first circumferential direction, and the second bristle set is angled in a second circumferential direction opposite the first circumferential direction.

9. The brush seal of claim 1, wherein the first bristle set extends from the joint at a first lay angle, and the second bristle set extends from the joint at a second lay angle different from the first lay angle.

10. A gas turbine engine comprising:
   a first engine component;
   a second engine component;
   a seal cavity extending between the first engine component and the second engine component; and
   a brush seal secured to the first engine component, the brush seal comprising:
      a top plate;
      a back plate;
      a bristle pack secured at a joint between the top plate and the back plate, the bristle pack comprising:

a first bristle set extending from the joint across the seal cavity toward the second engine component and configured to contact the second engine component; and a second bristle set extending from the joint towards the second engine component; and a sliding backing plate comprising:

a sliding portion disposed between the back plate and the second bristle set; and a support portion having an inner face, a support face, and a contact face, the inner face contacting a distal end of the second bristle set, the support face disposed adjacent and configured to support at least a portion of the first bristle set, and the contact face contacting the second engine component;

wherein the sliding backing plate is configured to slide relative to the back plate to maintain contact between the contact face and the second engine component and the second bristle set is configured to exert a first pushing force on an inner face of the support portion to drive the sliding backing plate into contact with the second engine component.

11. The gas turbine engine of claim 10, further comprising:

a slide assist configured to exert a second pushing force on an inner face of the sliding portion to drive the sliding backing plate relative to the back plate.

12. The gas turbine engine of claim 11, wherein the slide assist comprises a spring disposed within a chamber, the chamber at least partially defined by the inner face of the sliding portion, the second bristle set, and the back plate.

13. The gas turbine engine of claim 11, wherein the slide assist comprises:

a radial flow passage disposed between the brush seal and the first engine component; and an axial flow passage extending from the radial flow passage to a chamber, the chamber disposed between an inner face of the sliding portion, the second bristle set, and the back plate;

wherein the radial flow passage and the axial flow passage are configured to provide a pressurized fluid to the chamber to generate the second pushing force.

14. The gas turbine engine of claim 10, wherein the sliding backing plate further comprises:

a land extending from the inner face and disposed between the first bristle set and the second bristle set;

a slot defined by the land, the inner face, and the sliding portion, wherein the second bristle set is at least partially disposed within the slot.

15. The gas turbine engine of claim 10, further comprising:

a support plate secured to the joint and extending between the first bristle set and the second bristle set.

16. The gas turbine engine of claim 10, wherein the first bristle set is angled in a first circumferential direction, and the second bristle set is angled in a second circumferential direction opposite the first circumferential direction.

17. The gas turbine engine of claim 10, wherein the first bristle set extends from the joint at a first lay angle, and the second bristle set extends from the joint at a second lay angle different from the first lay angle.

18. The gas turbine engine of claim 10, wherein:

the second component comprises a rotating shaft; and the sliding backing plate comprises a plurality of sliding backing plate subassemblies lapped together to form the sliding backing plate.

19. A method of assembling a brush seal inside a seal cavity between a first engine component and a second engine component, the method comprising:

securing a first bristle set and a second bristle set between a top plate and a back plate;

inserting a sliding portion of a sliding backing plate between the second bristle set and the back plate such that a distal end of the second bristle set contacts and exerts a pushing force on an inner face of a support portion of the sliding backing plate, and such that a support face of the sliding backing plate is disposed adjacent the first bristle set;

securing the sliding backing plate to the back plate with an adhesive configured to vaporize at an operating temperature within the seal cavity; and attaching the brush seal to the first engine component such that the first bristle set extends into the seal cavity and contacts the second engine component;

wherein the second bristle set is configured to exert the pushing force on the inner face of the support portion to drive the sliding backing plate relative to the back plate.

* * * * *